(12) United States Patent
Bialostocki et al.

(10) Patent No.: US 10,146,831 B2
(45) Date of Patent: *Dec. 4, 2018

(54) PARAMETER NORMALIZATION FOR IMPROVED CACHE HIT RATE

(71) Applicant: Amazon Technologies, Inc., Seattle, WA (US)

(72) Inventors: Guy Bialostocki, Seattle, WA (US); Ram Cherukuri, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 990 days.

This patent is subject to a terminal disclaimer.

(21) Appl. No.: 14/484,109

(22) Filed: Sep. 11, 2014

(65) Prior Publication Data

US 2015/0046485 A1 Feb. 12, 2015

Related U.S. Application Data

(63) Continuation of application No. 13/297,105, filed on Nov. 15, 2011, now Pat. No. 8,856,022.

(51) Int. Cl.
*G06F 17/30* (2006.01)
*G06Q 30/02* (2012.01)
*G06Q 40/00* (2012.01)

(52) U.S. Cl.
CPC ... *G06F 17/30457* (2013.01); *G06Q 30/0283* (2013.01); *G06Q 40/10* (2013.01)

(58) Field of Classification Search
CPC .............................................. G06F 17/30457
See application file for complete search history.

(56) References Cited

U.S. PATENT DOCUMENTS

| | | | |
|---|---|---|---|
| 6,088,714 A | 7/2000 | Wadleigh et al. | |
| 7,864,187 B2 | 1/2011 | Fossum et al. | |
| 8,028,128 B2 | 9/2011 | Averill et al. | |
| 2002/0091574 A1 | 7/2002 | Lefebvre et al. | |
| 2002/0116302 A1* | 8/2002 | Wilmes | G06Q 20/207 705/31 |
| 2003/0055754 A1* | 3/2003 | Sullivan | G06Q 30/02 705/31 |
| 2004/0215588 A1 | 10/2004 | Cornelius | |
| 2005/0028174 A1* | 2/2005 | Rossmann | G06F 9/545 719/328 |
| 2005/0055279 A1 | 3/2005 | Baur et al. | |

(Continued)

OTHER PUBLICATIONS

"Truncation vs. Rounding," https://cloudfront.ualberta.ca/-/media/science/departments/computing-science1/teaching-resources/java/truncation-rounding.html, Oct. 1, 2002, retrieved on Mar. 1, 2018.*

(Continued)

*Primary Examiner* — Nathan Erb
(74) *Attorney, Agent, or Firm* — Knobbe, Martens, Olson & Bear, LLP

(57) ABSTRACT

A normalized caching system is configured to modify one or more parameters of a service request to generate a "normalized" service request, causing the service to return a normalized response. The normalized response is typically useful for servicing a wider range of subsequent requests than is a non-normalized response. Thus, a wider range of subsequent service requests can be serviced from the cache, without the need to send such service requests to the service.

20 Claims, 5 Drawing Sheets

(56) References Cited

U.S. PATENT DOCUMENTS

2005/0285859 A1    12/2005  Fossum et al.
2007/0033290 A1     2/2007  Van Valen, III et al.
2011/0264588 A1*   10/2011  Jensen .................. G06Q 10/08
                                                              705/80

OTHER PUBLICATIONS

Wikipedia, "Tax rate," www.wikipedia.org, version of article dated Nov. 10, 2010.*
Garrod, Charles, Putting the "Scalability" into Database Scalability Services, Carnegie Mellon University, Pittsburgh, Pennsylvania, Aug. 2008.*
Garrod, Charles, Putting the "Scalability" Into Database Scalability Services, Carnegie Mellon University, Aug. 2008 (of-record in parent application).

* cited by examiner

US 10,146,831 B2

PARAMETER NORMALIZATION FOR IMPROVED CACHE HIT RATE

PRIORITY CLAIM

This application is a continuation of U.S. application Ser. No. 13/297,105, filed Nov. 15, 2011, the disclosure of which is hereby incorporated by reference.

BACKGROUND

Many electronic services request data from other services. This may be accomplished by transmitting data in the form of a request. A request may include one or more parameters which may be used by the requested service in fulfillment of that request. Requests may occur in one or more manners, for example: (1) over an electronic network, (2) as a call to an application programming interface, (3) by writing data to a socket, file, or data store, (4) through some other data transmission, or (5) through some combination thereof. Commonly, a requested service may reply to a request with a data response. A data response may occur, for example, in one or more of the manners identified above for requests.

The transmission and fulfillment of a request may be associated with one or more costs, including time, bandwidth, processing, monetary and/or other costs. For example, the formation, transmission, and receipt processing of a response and/or request may result in such costs. The requested service's process of fulfilling a received request in order to create a response may additionally or alternatively result in such costs. For example, fulfillment may entail access to a slow data store, extensive use of a central processing unit, and/or a resulting request to one or more other services.

An electronic service may occasionally have reason to make a request that is identical to one it has previously made. To reduce costs associated with the transmission and fulfillment of duplicate requests, some electronic systems store responses in cache. A system may fulfill subsequent requests which are identical to an earlier request using a cached response associated with the earlier request. However, a request which is not identical to an earlier request may not be capable of being satisfied with a cached response.

BRIEF DESCRIPTION OF THE DRAWINGS

The accompanying drawings, which are incorporated in and form a part of this specification, illustrate example embodiments of the inventive subject matter, and in no way limit the scope of protection. Other embodiments are contemplated using alternate hardware and/or software platforms. The accompanying drawings illustrate embodiments wherein.

DETAILED DESCRIPTION OF SPECIFIC EMBODIMENTS

Overview

A normalized caching system may fulfill data requests using normalization and caching. In one embodiment, a normalized caching system receives a request with a plurality of parameters and normalizes one or more of the parameters in order to generate a normalized request. The system may query a cache to determine whether there is a cache hit for the normalized request. If there is a cache hit, the cached value may be used to satisfy the request. If there is no cache hit, the system may transmit the normalized request to a service and receive a response back, referred to as a normalized response. The system may cause a cache to store a value associated with the normalized response and may fulfill a subsequent request using that cached value. By normalizing requests, a normalized cache system may achieve a higher cache hit rate than a typical cache system. The normalization process typically produces a response that is useful for servicing a wider range of subsequent responses than would be a cached, non-normalized response.

Figure 1:
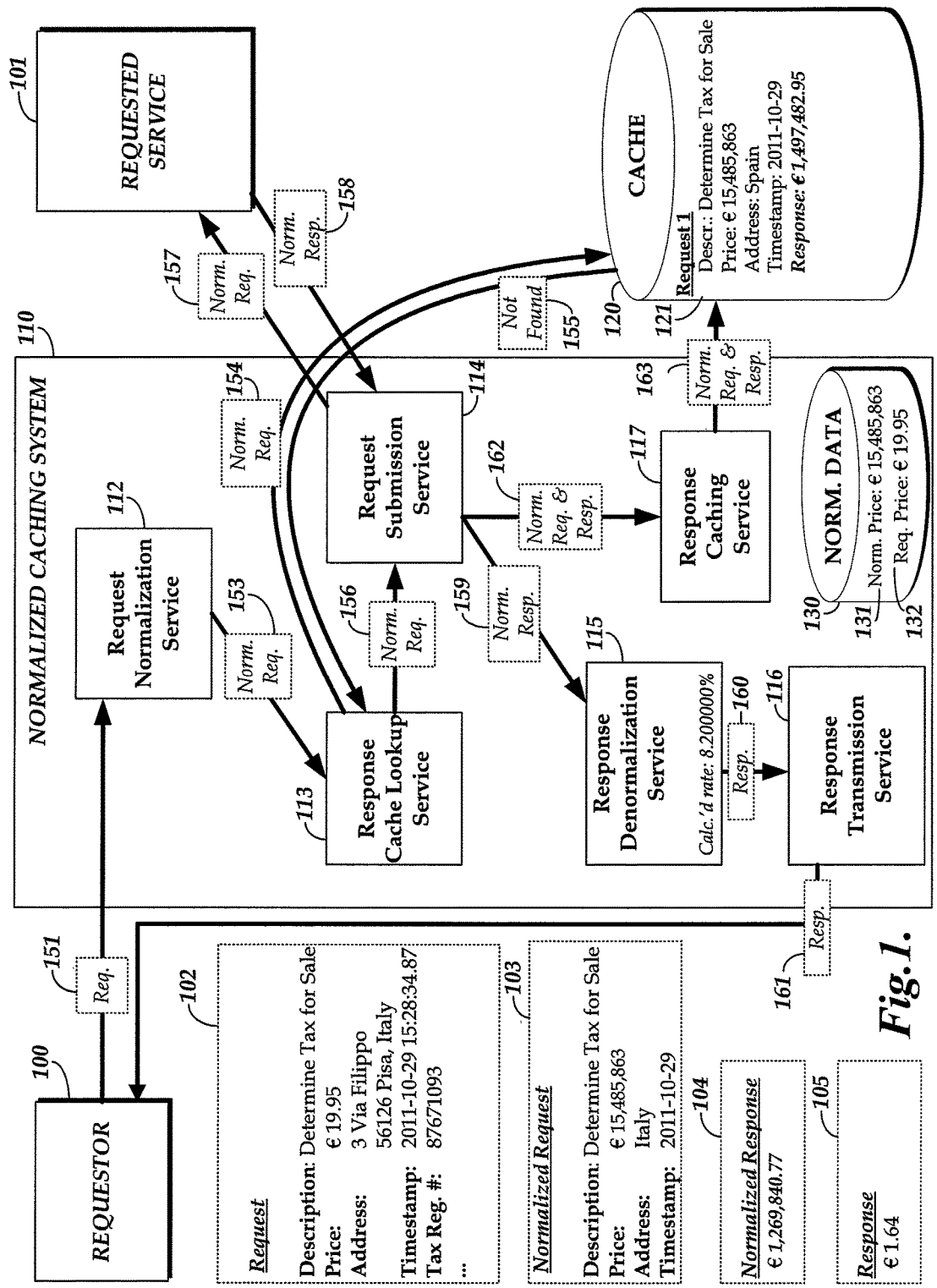
FIG. 1 depicts one embodiment of a system for caching responses to normalized requests, and shows a process flow associated with transmitting a normalized request to a service and caching a response.

Referring to FIG. 1, an embodiment of a system for fulfilling data requests using normalized caching is shown. For purposes of illustration, the system will be described in the context of a request for tax information. As will be recognized, the illustrated architecture and process are also applicable to requests for other types of information, such as location identification from a phone number.

As depicted in FIG. 1, a requestor 100 transmits a data request 151 for a sales tax amount, the parameters of the request 151 shown in box 102. A normalized caching system 110 receives the request 151 and generates a normalized request 153 based on it. The normalized request 153 includes a fixed, large, prime price amount 103, and address and timestamp values 103 which are shortened versions of corresponding values in the original request 102. The normalized caching system determines whether a cache 120 stores a value associated with the normalized request 120. If so, that value may be used as a normalized response to the normalized request 153. In FIG. 1, the cache 120 does not currently contain such a value, so the normalized caching system 110 transmits the normalized request 157 to the requested service 101. A normalized response 158, 104 is received in return—corresponding to a tax amount for a sale in Italy on the identified date, for the normalized price. The normalized response is cached 163, and denormalized by calculating a tax rate based on the normalized price and corresponding normalized tax amount. Denormalization further involves applying that calculated tax rate of 8.200000% to the request's price 202, 132 in order to generate a response 160, 105 which is transmitted 161 to the requestor 100.

Figure 2:
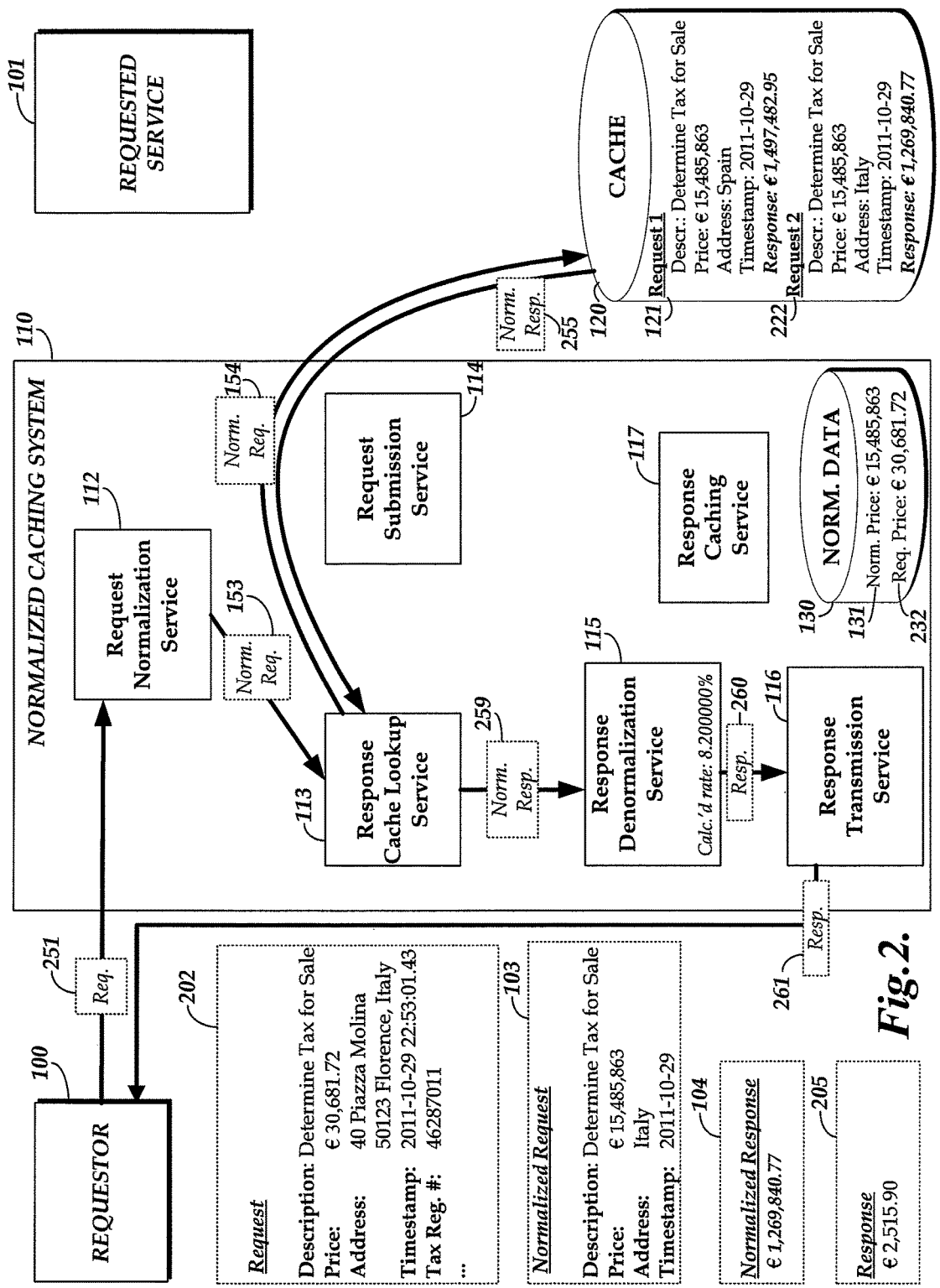
FIG. 2 depicts the embodiment of FIG. 1, and shows a process flow associated with fulfilling a request using a previously cached response.

Referring to FIG. 2, the same embodiment is shown when a subsequent request 251 is received by the normalized caching system 110. The subsequent request 251 includes some parameters 202 different from those of the first request 102 of FIG. 1. The normalization process in FIG. 2 generates a normalized request 153, 103 equivalent to the normalized request 103 corresponding to the first request 102 of FIG. 1.

The normalized caching system in FIG. 2 determines that a normalized response value 255, 104 is cached for that normalized request 154, 222, and uses that cached value to generate a response 260, 205, 261.

Request

Certain components of the illustrated embodiments are now described in greater detail. Referring to FIG. 1, the requestor 100 is shown transmitting a request 151. The requestor may be, for example, some software service running on computer hardware. The transmission of the request 151 may occur by one or more means such as (1) over an electronic network (2) as a call to an application programming interface (3) by writing data to a socket, file, or data store, (4) through some other data transmission, or (5) through some combination thereof. The request 151 is received by a normalized caching system 110. In one embodiment, the normalized caching system is a collection of software services running on the same computer hardware that runs a service associated with the requestor 100. In another embodiment, the normalized caching system 110 runs on different hardware than that of the requestor 100. For example, the normalized caching system 110 may be implemented on a proxy server that acts as an intermediary between the requester 100 and one or more services; such a proxy server may, but need not, be local to the requestor 100.

In some embodiments, the normalized caching system 110 may serve as a proxy between the requestor 100 and the requested service 101. Furthermore, the normalized caching system 110 may serve as a proxy between multiple requestors and a requested service 100, such that normalized responses cached as a result of fulfilling a request from a first requestor may be used in fulfilling a request from a second requestor. The normalized caching system 110 may also perform load balancing such that a request 151 which it receives from a requestor 100 may be fulfilled by alternative services, and the normalized caching system 110 selects the particular service which may be used to fulfill the request 151, if the normalized caching system 110 cannot itself fulfill the request using a cache 120.

In the embodiment of FIG. 1, a single requested service 101 is shown. The request 151 may identify the requested service 101 which the requestor is requesting to fulfill the request 151. For example, the request may include a destination field with a value associated with the requested service 101. In another embodiment, the request does not identify, and is not associated with, any particular requested service at the time that it is transmitted by the requestor 100. In such an embodiment, the request 151 may be routed by some other service so that it reaches a service capable of fulfilling the request. In the illustrated embodiment, the request 151 is targeted for a requested service 101 which is capable of determining a sales tax amount based on the parameters of a request.

The request 151 is described in greater detail in box 102, which depicts the request's parameters as including (1) a description of the request as a request for a determination of a tax amount for a sale, (2) a sale price, of £19.95, for which a tax determination is being requested, (3) an address for the purchaser associated with the sale, 3 Via Filippo, 56126 Pisa, Italy, (4) a timestamp of 20111029 15:28:34.87, corresponding to Oct. 29, 2011 at 3:28 p.m. and 34.87 seconds, the time at which the sale was made, and (5) a tax registration number of a seller associated with the sale. The request may include additional parameters. In other embodiments, requests for other types of service and/or information may additionally or alternatively be made. Also, a request of the same description type may include different parameters and/or parameter values as the request 102 of this embodiment. Another example of a request is for the name of the city corresponding to a phone number.

Normalized Caching System

As shown in FIG. 1, the request 151 transmitted by the requestor 100 is received by the normalized caching system 110. The normalized caching system 110 caches requests in a normalized manner such that some future requests may be fulfilled by the cache even if those future requests are not identical to any prior requests.

Normalization

A request normalization service 112 of the present embodiment receives the request 151 and, if appropriate, generates a normalized version of the request 153 in response. The normalized request includes one or more normalized parameters as shown in box 103. Some of the normalized parameters may be calculated based on one or more parameters of the request 151, 102. For example, the request normalization service 112 normalizes the address parameter by shortening it from a specific street address (3 Via Filippo, 56126 Pisa, Italy) to the country (Italy) contained in the street address. In the illustrated embodiment, this normalization is performed because sales tax rates vary between different European countries, but not within Italy itself. In another example, where a shipping address was located within the United States, address normalization may leave the normalized address at a more granular level, such as identifying a state and country, or zip code. In some embodiments, the normalized caching system 110 may access data indicating the degree of granularity necessary for various types of normalizations. For example, such data may indicate that, for Italian addresses, country identification is sufficiently descriptive for purposes of calculating a sales tax amount.

Similarly, the timestamp value of the request 151, 102 is normalized by making it less specific. The timestamp of the request indicates the date, hour, minute, second, and fraction of a second when the relevant sale was made. However, in this embodiment sales tax amounts are treated as potentially changing between days, but not within a day. Accordingly, the request normalization service 112 normalizes the timestamp by generating a date-only timestamp value for the normalized request 103. Normalization may additionally or alternatively omit parameters from the normalized request 103 which were present in the request 102. For example, the tax registration number may not affect the sales tax amount and may therefore be omitted from the normalized request. Other parameters not shown in the request 102 may be similarly omitted. The description parameter of the request 102 remains unchanged in the normalized request 103.

The price parameter is normalized to the large, prime value of £15,485,863, to which the present embodiment normalizes all price amounts. In this embodiment, a large prime price is used so that the tax amount received in response will be detailed, for example by having a high degree of numeric resolution. This process of using a fixed normalization value for price may be used in the present embodiment because sales tax in the relevant region is calculated purely by applying a rate to an amount. A sales tax amount response from the requested service 101 may therefore be fully descriptive for calculating sales tax for other purchase amounts, as long as sufficient numeric resolution is obtained. For example, suppose the sales tax in Italy is 8.2%. The sales tax for a £1 sale would be the rounded value of 8.2% of £1, which is £0.082 rounded to £0.08. Based on a resulting £0.08 sales tax response, a service attempting to calculate a sales tax rate may calculate that an 8% sales tax was applied. If this calculated rate was used to fulfill future requests, inaccurate responses could be returned. The use of a large number may increase numeric resolution by reducing the effects of rounding. For example, the use of a normalized price amount which is as large as the largest price amount expected in responses may provide a numeric resolution sufficiently high to avoid such rounding issues. The use of a prime number may also improve numeric resolution by avoiding rounding ambiguities resulting from even division amounts. The number 15,485,863 is the one-millionth prime number and is larger than any price amount for which sales tax is expected to be calculated for in the illustrated embodiment.

In the present embodiment, all requests made on a particular day, from Italy, will be normalized to a normalized request 103 containing the same values. When describing a response provided by the requested service 101 in response to receiving a normalized request, such a response will be referred to as a normalized response 158. The description of the response as normalized refers to its having been provided in response to a normalized request 157. No normalization need be performed on the response itself for it to be considered a normalized response 158 in this context. Because the requested service 101 is expected to provide a response strictly determined by the parameters of the corresponding request, many different requests may have the same corresponding normalized request and therefore the same corresponding normalized response. In some embodiments, this mapping of different requests to a common normalized response may facilitate improved caching and response fulfillment.

Cache

Referring to FIG. 1, the request normalization service 112 provides the normalized request 153 to a response cache lookup service 113, which is in communication with a cache data store 120. In some embodiments, the cache 120 may store data on electronic hardware shared by the normalized caching system 110. In another embodiment, the cache 120 may be external to hardware hosting the normalized caching system 110. Additionally or alternatively, the cache 120 may be provided as a cloud-based service. The response cache lookup service 113 checks whether the cache 120 contains a value associated with the normalized request 154. For example, in FIG. 1, the cache 120 is shown as storing a normalized response of £1,497,482.95, which is keyed in the cache based on the combination of the normalized request parameters: (1) Description=Determine Tax for Sale, (2) Price=£15,485,863, (3) Address=Spain, and (4) Timestamp=20111029. However, the cache 120 does not have a storage entry keyed by the parameters of the normalized request 154 associated with Italy. The response cache lookup service 113 therefore receives an indication from the cache 120 that no cache entry exists for the normalized request 154 provided. The normalized caching system 110 determines that the cache 120 cannot be used to satisfy the present request 151 and will therefore communicate with the requested service 101 in order to satisfy the request 151.

Requested Service

Referring to FIG. 1, A request submission service 114 of the normalized caching system 110 transmits the normalized request 157 to the requested service 101. In the illustrated embodiment, the requested service 101 runs on separate hardware from the normalized caching system 110. In another embodiment, the requested service runs on at least some hardware used by the normalized caching system. The transmission of the normalized request 157 may occur by one or more means such as (1) over an electronic network (2) as a call to an application programming interface (3) by writing data to a socket, file, or data store, (4) through some other data transmission, or (5) through some combination thereof.

The request submission service 114 is shown as receiving a normalized response 158, which has been explained as being a response to the normalized request 157 and not necessarily a value which was itself normalized. The contents of the normalized response 158 are shown in box 104. The normalized response 158, 104 includes a sales tax amount value of £1,269,840.77. In another embodiment, a response, such as a normalized response 104, may include a plurality of values. For example, it may identify a national sales tax amount, a state sales tax amount, and a city sales tax amount. In the illustrated example, a single sales tax amount 104 is provided.

The normalized request and normalized response 162 are provided to a response caching service 117 which transmits both to the cache 120. The cache in FIG. 1 is illustrated before the cache records the normalized request and normalized response which are transmitted to it for caching 163. The request submission service 114 also provides the normalized response to a response denormalization service 115.

Denormalization

The response denormalization service 115 of the present embodiment reverses the effects of normalization such that a nonnormalized response 160 can be provided to the request 151 received by the normalized caching system 110. The response denormalization service 115 calculates the tax rate for the sale as the quotient of the normalized response tax amount 104, over the normalized request price amount 131, which is £(1,269,840.77/£15,485,863)=8.200000%. The response denormalization service 115 applies that calculated rate to the request's price amount of £19.95 and calculates a response value of £19.95*8.200000%=£1.64.

The response denormalization service 115 may access normalization data 130 in performing denormalization. For example, normalization data 130 may store the fixed normalization price amount 131 used during normalizing a request's price parameter. The normalization data 130 may also store the pre-normalization price amount for a received request's price amount 132. The denormalization service may then calculate a response's 160 price amount using the three values (1) normalized request price amount, (2) received normalized response tax amount, and (3) pre-normalization request price amount. In other embodiments, other denormalization processes and/or calculations may be used.

The response denormalization service 115 provides the response sales tax amount as part of a response 160. In the illustrated embodiment, a response transmission service 116 receives the response 160 provided by the response denormalization service 115 and formats and/or processes the response 160 into a form which is transmitted 161 to the requestor 100. For example, the response transmission service 116 may cause the response 161 to adhere to one or more protocols associated with transmission to the requestor 100. As another example, the response transmission service 116 may provide the response 161 in the form of a return value associated with a SOAP interface.

Subsequent Request Fulfillment

Referring to FIG. 2, the same embodiment of FIG. 1 is shown at a later point in time. The requestor 100 transmits another request 251, which has parameter 202 indicating a different price, address, timestamp, and tax registration number than the request 151 of FIG. 1. The request normalization service 112 normalizes the second request 251 to a normalized request 153, 103 equivalent to the normalized request for the first request. In this example, the normalized requests are equivalent because their corresponding requests both have address parameters within Italy, and timestamps for the same date. Each request's price parameter is replaced with the fixed, large, prime value of £15,485,863.

The response cache lookup service 113 queries the cache 120 for a normalized response value associated with the normalized request 154. The cache stores a response value 222 of £1,269,840.77, which is keyed by the parameters: (1) Description=Determine Tax for Sale, (2) Price=£15,485,863, and (3) Timestamp=20111029. Because all three of these cache key parameters equal the parameters of the normalized request 154 submitted for a cache lookup, the cache 120 returns the normalized response amount keyed by those parameters 222. In this example, that value was placed in cache during the process described in reference to FIG. 1. The response cache lookup service 113 illustrated in FIG. 2 provides the normalized response 259 received from the cache 120 to the response denormalization service 115.

The response denormalization service 115 calculates the tax rate for the sale as the quotient of the normalized response tax amount 104, over the normalized request price amount 131, which is £(1,269,840.77/£15,485,863) =8.200000%. The response denormalization service 115 applies that calculated rate to the request's price amount of £30,681.72, which it may retrieve from the normalized data store 232. The resulting amount of £30,681.72*8.200000%=£2,515.90 is provided to the requestor 100 in the form of a response 261, the contents of which are shown in box 205.

The normalized caching system 110 of the illustrated embodiment is thereby capable of fulfilling some subsequent requests using a cache, even when those subsequent requests are not equivalent to previously received requests. By avoiding some subsequent transmissions to the requested service 101, the normalized caching system 110 may reduce resource costs associated with request fulfillment.

Associated Value Caching

Figure 3:
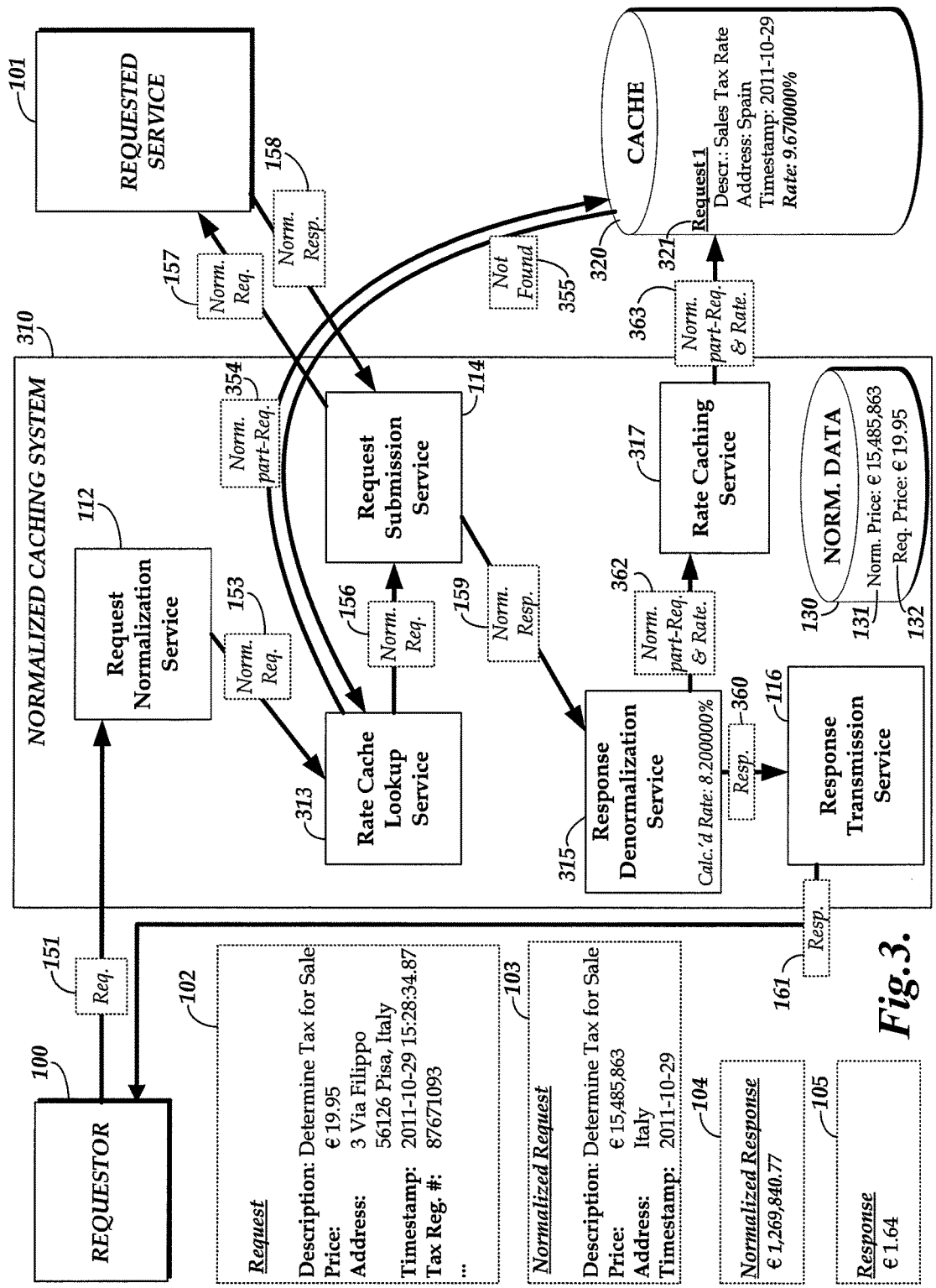
FIG. 3 depicts one embodiment of a system for caching values associated with responses to normalized requests, and shows a process flow associated with transmitting a normalized request to a service and caching a value associated with a response.

In another embodiment, a normalized caching system 110 fulfills data responses using normalization and caching, but stores a value associated with a normalized response instead of, or in addition to, caching the normalized response itself. Referring to FIG. 3, an embodiment of such a normalized caching system 310 is shown. The cache 320 caches a tax rate 321 keyed by one or more normalized request parameters. The cached tax rate 321 may have been calculated in the manner described in reference to FIGS. 1 and 2 for denormalizing a response value. For example, referring to FIG. 3, a request 151 is received which has the same values as the request 151 described in reference to FIG. 1. The request normalization service 112 of FIG. 3 performs the same normalization process as previously discussed for the request 151, resulting in an equivalent normalized request 153.

The rate cache lookup service 313 of FIG. 3 performs a query of a cache 320 in order to determine a rate to apply to a price amount. The cache query is based on a normalized partial request 354. The normalized partial request 354 has a description of "Sales Tax Rate," corresponding to the sales tax rate values cached by the cache 320. The normalized partial request 354 does not include a price amount parameter because the sales tax rate in this embodiment is not affected by the amount of a sale. At the time illustrated by FIG. 3, the cache 320 stores a single cache entry, which has a set of normalized partial request parameters as its key: (1) Description=Sales Tax Rate, (2) Address=Spain, and (3) Timestamp=20111029. The sales tax rate value cached under this key is 9.670000%.

The rate cache lookup service receives a response 355 that no cache entry was found corresponding to the queried normalized partial-request 354. The request submission service 114 then transmits the normalized request 157, 103 to the requested service 101, and receives a normalized response 158, 103. The response denormalization service 315 receives the normalized response 159, 103, and denormalizes it in the same manner described with reference to FIG. 1. The resulting response is transmitted to the requestor 100, as with FIG. 1. However, the response denormalization service 315 of FIG. 3 provides the rate caching service 317 with different information to cache as compared to the response denormalization service 115 of FIG. 1.

In the embodiment of FIG. 3, the response denormalization service provides the calculated sales tax rate of 8.200000% to a rate caching service 317, in addition to the parameters associated with a normalized partial-request. The rate caching service 317 causes the cache 320 to store a new entry, with a sales tax rate value of 8.200000%, keyed by the parameter set: (1) Description=Sales Tax Rate, (2) Address=Italy, and (3) Timestamp=20111029. The cache in FIG. 3 is shown before that new entry is stored by the cache 320.

Figure 4:
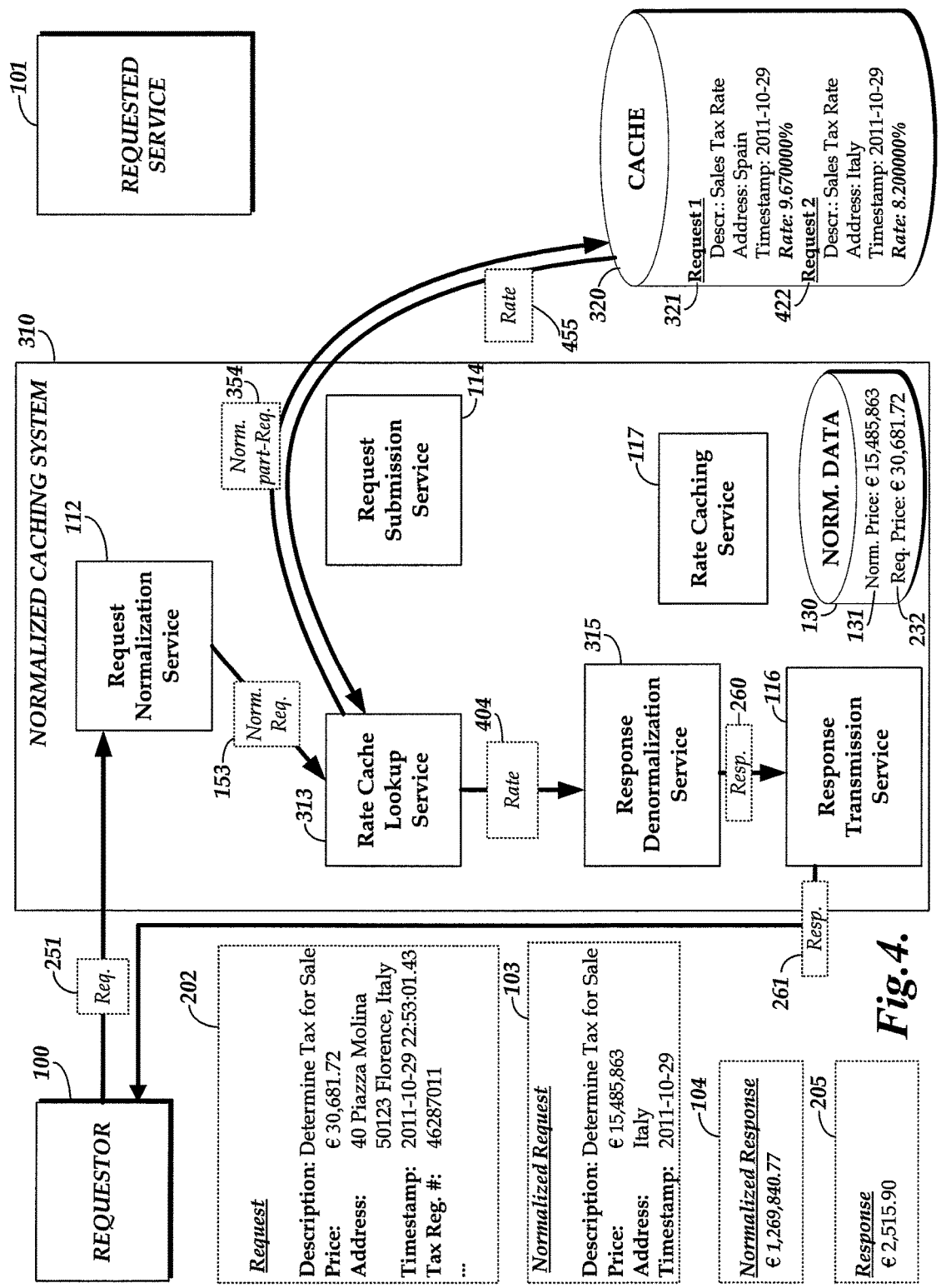
FIG. 4 depicts the embodiment of FIG. 2, and shows a process flow associated with fulfilling a request using a previously cached value associated with a response.

Referring to FIG. 4, the same embodiment of FIG. 3 is shown at a later point in time. The cache 320 stores the tax rate entry 422 which was described as being calculated and submitted for caching with reference to FIG. 3. Referring to FIG. 4, a new request 251, 202 is received, having the same parameters as the request 251, 202 described in reference to FIG. 2. The normalized caching system 110 normalizes the request 251, 202 to create a normalized request 153, 103. The rate cache lookup service 313 queries the cache 320 to determine whether an entry is stored under the key (1) Description=Sales Tax Rate, (2) Address=Italy, and (3) Timestamp=20111029. The rate cache lookup service 313 receives the sales tax rate of 8.200000% in response 455 to the query 354.

The response denormalization service 315 uses the rate obtained from the cache 320 in order to determine the response value 260. In this embodiment, the denormalization service applies the rate to the request price 232 which is associated with the normalized partial-request 354 under which the rate was keyed in the cache 320. The denormalization in this embodiment therefore does not require the manipulation of normalized value. The response denormalization service 315 calculates that the response 260 has a sales tax amount equal to the product of the request price 232 and the sales tax rate 404. That is, the response is equal to £30,681.72*8.200000%=£2,515.90. A response 261 which includes this sales tax amount is transmitted to the requestor 100.

In some embodiments, a cache data store 120 may store only some portions of a normalized response 158, or data associated with one or more portions of a normalized response 158. Additionally or alternatively, a normalized caching system 110 may cache some normalized responses for which a corresponding value is not already cached, but may also not cache other normalized responses for which a corresponding value is not already cached. For example, caching may be performed for normalized requests associated with books, but not for normalized requests associated with computers. In another embodiment, whether a normalized caching service normalizes a request may be affected by the contents of that request. For example, a request for the determination of a tax amount might not be normalized if an address value in that request corresponds to a tax jurisdiction which uses a nonlinear tax rate.

Request Fulfillment

Figure 5:
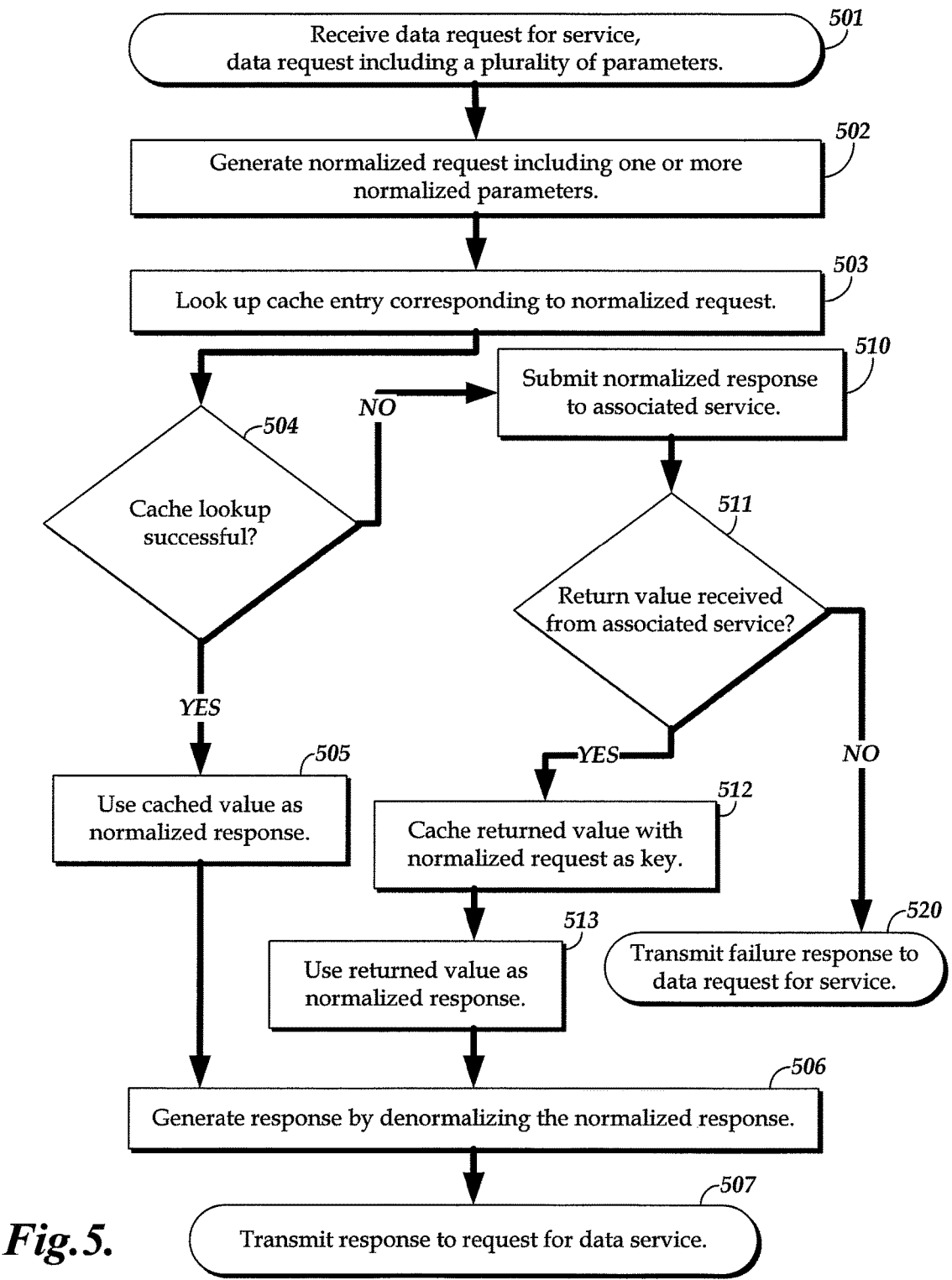
FIG. 5 illustrates an embodiment of a process for fulfilling requests using parameter normalization and caching.

Referring to FIG. 5, an illustration of one embodiment of a process for fulfilling data requests using parameter normalization and caching is shown. The process begins when a data request for a service is received 501. The received request includes a plurality of parameters 501. A normalized request is generated, the normalized request including one or more normalized parameters 502. The process next performs a cache lookup for an entry corresponding to the normalized request 503. A determination is made as to whether the cache lookup was successful 504. If the cache lookup was not successful, the normalized response is submitted to an associated service 510. A determination is made whether a return value was received from the associated service 511. If no such return value was received, a failure response is transmitted in response to the data request for service 520. If a return value was received from the associated service, that return value is cached with the normalized response as its key 512. The returned value is used as a normalized response 513, which is denormalized in order to generate a response 506. If the earlier cache lookup had been successful, the cached value would have been used as the normalized response 505, and would be denormalized in order to generate a response 506. The response is then transmitted in response to the request for data service 507.

Normalization Verification and Training

In one embodiment, a normalized caching system performs normalization verification by submitting both a request and a corresponding normalized request, to a service for fulfillment. The normalized caching system may receive a response to the request, and a normalized response to the normalized request. The system may perform denormalization on the normalized response in order to generate a denormalized response. It may then compare the denormalized response to the response in order to verify the normalization and denormalization process. If the denormalized response is not equivalent to the response, normalization and/or denormalization may be determined to be faulty and may be adjusted and/or ceased for certain circumstances. For example, normalization verification may be used in combination with systematically altering certain parameters which are being normalized in order to determine which parameter normalization is responsible for the general normalization fault.

Alternatively or additionally, an embodiment may perform normalization training in order to adjust the extent to which it normalizes various request parameters. For example, a normalized caching system may train the extent to which it normalizes an address parameter value. The training process may involve selecting a certain extent of normalization, such as removing a street address and leaving in place a city, state, and country. A plurality of requests and their corresponding normalized requests may be submitted and the corresponding responses and normalized responses received. Normalized responses may be denormalized. The system may determine whether the normalization was accurate based on whether some denormalized responses are equivalent compared to their corresponding responses. If no fault is detected, the normalization process may be adjusted by increasing the extent of normalization—for example, by removing street address and city information from requests. The same submission and determination process may be followed, and repeated, until an extent of verification is reached which introduces fault. The most recent verification adjustment may be reversed in order to revert back to the last fault free normalization level. Normalization training may thereby seek to maximize the extent of normalization which may be implemented without introducing fault, and may thus improve the benefits of normalized caching.

Conclusion

Certain embodiments have been described in which cache entries are keyed according to, at least in part, a timestamp and/or date value. In some examples, a cache cleanup service may remove cache entries which are considered expired. For example, in an embodiment where request normalization includes normalizing a timestamp to a date field, a cache cleanup service may run at regular intervals and remove cache entries which are keyed according to values more than a day or two old. This may occur because the normalized caching system 110 in such an embodiment may expect that most requests which it receives will be for recently completed purchases, and cache entries keyed by an old date will rarely be queried for.

The normalized caching system 110 may be implemented as computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. A normalized caching system may be implemented as part of an online marketplace or store that processes orders place by users over the Internet. In such an embodiment, the requestor may be an order processing component associated with the online marketplace. A normalized caching system may include a request receipt service which receives incoming requests from requestors. For example, a request receipt service may comprise software for processing one or more protocols associated with the request, or may provide a Simple Object Access Protocol ("SOAP") interface associated with the normalized caching system. The request receipt service may process and/or reformat a request and provide the request in a format capable of being received by a request normalization service. In other embodiments, a normalized a normalization service is the first point at which a request is received and/or processed by a normalized caching system.

Each of the services shown in FIGS. 1-4 may be implemented in an appropriate combination of computer hardware and software, or in application-specific circuitry. For example, each such service may be implemented in service code executed by one or more physical servers or other computing devices. The service code may be stored on non-transitory computer storage devices or media. The various data repositories 120, 130, 320 may include persistent data storage devices (hard drives, solid state memory, etc.) that store the disclosed data, and may include associated code for managing such data.

Although the inventions have been described in terms of certain preferred embodiments, other embodiments will be apparent to those of ordinary skilled in the art, including embodiments that do not include all of the features and benefits set forth herein. Accordingly, the invention is defined only by the appended claims. Any manner of software designs, architectures or programming languages can be used in order to implement embodiments of the invention. Components of the invention may be implemented in distributed, cloud-based, and/or web-based manners.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

What is claimed is:

1. A normalized caching system configured to operate as an intermediary between one or more data requestors and a data service, the normalized caching system comprising:
   one or more computing devices configured to implement a process that comprises:
      receiving a first request from a requestor for data supplied by the data service, said first request comprising a plurality of parameters;
      normalizing the first request by modifying at least one of the parameters, wherein modifying at least one of the parameters comprises replacing a numeric parameter with a value that is not derived from a current value of the numeric parameter;
      sending the normalized first request to the data service, and receiving a response from the data service to the normalized first request;
      storing a representation of the response in a cache;
      denormalizing the response, and providing the denormalized response to the requestor in fulfillment of the first request, wherein denormalizing the response reverses an effect of normalizing the first request;
      subsequently, receiving a second request from a requestor for data supplied by the data service, said second request comprising a plurality of parameters, said second request differing from the first request in at least one parameter; and
      generating a response to the second request based on the representation stored in the cache, such that the second request is fulfilled without sending an additional request to the data service;
      wherein the normalization of the first request enables the normalized caching system to re-use the response received from the data service to fulfill the second request.

2. The normalized caching system of claim 1, wherein the first request and the second request are requests for tax amounts.

3. The normalized caching system of claim 2, wherein the numeric parameter is a price parameter.

4. The normalized caching system of claim 1, wherein the first request and the second request are requests for monetary amounts.

5. The normalized caching system of claim 4, wherein normalizing the first request comprises modifying a monetary parameter of the first request.

6. The normalized caching system of claim 1, wherein normalizing the first request causes the data service to return numerical information that would not be returned if the first request were sent to the data service without modification.

7. The normalized caching system of claim 1, wherein the process further comprises:
   sending the first request, without normalization, to the data service;
   receiving a response from the data service to the non-normalized first request; and
   determining whether the data service's response to the non-normalized first request is equivalent to the data service's response to the normalized first request.

8. A non-transitory computer readable medium which stores executable program instructions that, upon execution by a computing system comprising one or more computing devices, cause the computing system to perform a process that comprises:
   receiving a first request for data supplied by a data service, the first request comprising a plurality of parameters;
   modifying the first request by modifying at least one of the parameters, wherein modifying at least one of the parameters comprises replacing a numeric parameter with a value that is not derived from a current value of the numeric parameter;
   sending the modified first request to the data service, and receiving a response from the data service to the modified first request;
   storing a representation of the response in a cache;
   modifying the response to reverse an effect of modifying the first request, and using the modified response to fulfill the first request;
   subsequently, receiving a second request for data supplied by the data service, the second request comprising a plurality of parameters, the second request differing from the first request in at least one parameter; and
   generating a response to the second request based on the representation stored in the cache, such that the second request is fulfilled without sending an additional request to the data service;

wherein modifying the first request enables the response from the data service to be re-used to fulfill the second request.

9. The non-transitory computer readable medium of claim 8, wherein the first request and the second request are requests for tax amounts.

10. The non-transitory computer readable medium of claim 9, wherein the numeric parameter is a price parameter.

11. The non-transitory computer readable medium of claim 8, wherein the first request and the second request are requests for monetary amounts.

12. The non-transitory computer readable medium of claim 11, wherein modifying the first request comprises modifying a monetary parameter of the first request.

13. The non-transitory computer readable medium of claim 8, wherein modifying the first request causes the data service to return numerical information that would not be returned if the first request were sent to the data service without modification.

14. The non-transitory computer readable medium of claim 8, wherein the process further comprises:
   sending the first request, without modification, to the data service;
   receiving a response from the data service to the unmodified first request; and
   determining whether the data service's response to the unmodified first request is equivalent to the data service's response to the modified first request.

15. A method comprising:
   receiving a first request for data supplied by a service, said first request comprising a first plurality of parameters;
   normalizing the first request by modifying one or more of said first plurality of parameters, wherein modifying one or more of said first plurality of parameters comprises modifying a numeric parameter having a current value by replacing the current value with a replacement value that is not derived from the current value;
   sending the normalized first request to the service, and receiving a first response;
   storing a value associated with the first response to the normalized first request in a cache;
   receiving a second request for data supplied by the service, said second request comprising a second plurality of parameters;
   retrieving from the cache the stored value associated with the first response to the normalized first request; and
   fulfilling the second request using the retrieved value;
   said method performed by a computer system that comprises one or more physical servers.

16. The method of claim 15, wherein the value associated with the first response to the normalized first request is a rate.

17. The method of claim 16, wherein the rate is a tax rate calculated at least in part from (1) a price parameter of the normalized first request, and (2) the first response.

18. The method of claim 15, wherein normalizing the first request comprises adjusting an address value of the first request.

19. The method of claim 18, wherein adjusting the address value of the first request comprises removing at least a first address component and maintaining at least a second address component, said first address component relating to fewer addresses than said second address component.

20. The method of claim 15, further comprising sending the first request, without normalization, to the service and receiving a second response; and determining whether said first response is equivalent to said second response.

* * * * *